(12) United States Patent
Akdemir et al.

(10) Patent No.: US 9,268,941 B1
(45) Date of Patent: Feb. 23, 2016

(54) METHOD FOR SECURE SOFTWARE RESUME FROM LOW POWER MODE

(71) Applicant: MARVELL INTERNATIONAL LTD., Hamilton (BM)

(72) Inventors: Kahraman D. Akdemir, Franklin, MA (US); Tolga Nihat Aytek, Framingham, MA (US)

(73) Assignee: MARVELL INTERNATIONAL LTD. (BM)

( * ) Notice: Subject to any disclaimer, the term of this patent is extended or adjusted under 35 U.S.C. 154(b) by 282 days.

(21) Appl. No.: 13/874,759

(22) Filed: May 1, 2013

Related U.S. Application Data (60) Provisional application No. 61/641,173, filed on May 1, 2012.

(51) Int. Cl.
  *G06F 15/177* (2006.01)
  *G06F 21/57* (2013.01)

(52) U.S. Cl.
  CPC ..................... *G06F 21/572* (2013.01)

(58) Field of Classification Search
  CPC .......... G06F 1/32; G06F 11/00; G06F 15/177
  USPC ........................................................ 713/320
  See application file for complete search history.

(56) References Cited

U.S. PATENT DOCUMENTS

| | | | |
|---|---|---|---|
| 6,694,451 B2 * | 2/2004 | Atkinson | 714/15 |
| 6,968,469 B1 * | 11/2005 | Fleischmann et al. | 713/324 |
| 2003/0196137 A1 * | 10/2003 | Ahmad et al. | 714/13 |
| 2004/0148536 A1 * | 7/2004 | Zimmer et al. | 713/323 |
| 2008/0244292 A1 * | 10/2008 | Kumar et al. | 713/323 |
| 2008/0279022 A1 * | 11/2008 | Lee | 365/201 |
| 2009/0100516 A1 * | 4/2009 | Ray et al. | 726/19 |
| 2009/0172439 A1 * | 7/2009 | Cooper et al. | 713/323 |
| 2009/0187689 A1 * | 7/2009 | Roohparvar | 710/100 |
| 2010/0037076 A1 * | 2/2010 | Reece et al. | 713/324 |
| 2010/0169968 A1 * | 7/2010 | Shanbhogue et al. | 726/22 |
| 2013/0173942 A1 * | 7/2013 | Forristal et al. | 713/323 |
| 2013/0227267 A1 * | 8/2013 | Senda | 713/2 |

* cited by examiner

*Primary Examiner* — Vincent Tran (57) ABSTRACT

Systems, methods, and other embodiments associated with a secure software resume from low power mode are described. According to one embodiment, a method includes receiving a request to enter a low power mode. In response to the request, the method includes storing a data section in LPDRM, performing a validation function on the data section to compute a validation value, and constructing a resume package that includes the validation value and a location of the data section in the LPDRM. The resume package is stored in the LPDRM for use in resuming operation after exiting low power mode.

16 Claims, 6 Drawing Sheets

METHOD FOR SECURE SOFTWARE RESUME FROM LOW POWER MODE

CROSS REFERENCE TO RELATED APPLICATIONS

This patent disclosure claims the benefit of U.S. provisional application Ser. No. 61/641,173 filed on May 1, 2012, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Low power consumption and response times are important requirements in today's mobile device market. With the increasing popularity of mobile devices such as smart phones, tablet devices, etc. which are capable of handling various computation tasks, battery life has become a major differentiating factor. In order to provide efficiency in power usage (and hence in battery life), these devices provide a suspend feature which will minimize power consumption by putting the device into a low power (e.g., sleep or hibernation) mode when it is not being used. At the same time, these devices also provide a resume process which will take the device out of low power mode and put it into its original state as quickly as possible.

SUMMARY

In general, in one aspect this specification discloses a device. The device includes a low power data retentive memory (LPDRM) and a package logic. The package logic is configured to receive a request from the device to enter a low power mode. In response to the request to enter a low power mode, the package logic constructs a resume package that includes a location of a data section stored in the LPDRM and a validation value that results from performing a validation function on the data section. The package logic stores the resume package in the LPDRM for use by the device in resuming operation when exiting the low power mode.

In general, in another aspect, this specification discloses a method. The method includes receiving a request to enter a low power mode. In response to the request, the method includes storing a data section in LPDRM; performing a validation function on the data section to compute a validation value; constructing a resume package that includes the validation value and a location of the data section in the LPDRM, and storing the resume package in the LPDRM. The method includes granting the request to enter low power mode.

In general, in another aspect, this specification discloses a device. The device includes a secure boot ROM that includes an encoded security value and a flash memory configured to store data in a manner that is verifiable by the secure boot ROM based on the security value. The device also includes a LPDRM configured to store data for access by an operating system and a resume logic. The resume logic is configured to, in response to receiving a boot signal from the device operating in a low power mode cause the secure boot ROM to validate a data section stored in the LPDRM based on the security value, and when the data section is successfully validated, transfer control of the device to an operating system without loading an image corresponding to the data section from the flash memory.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Mobile devices are often used to perform secure transactions. For example, mobile devices are used to provide passwords for financial transactions and to gain access to encrypted media content. Criminal hackers seek to intercept the passwords or other confidential information for their own gain. Mobile devices are also vulnerable to unauthorized users adapting the device in a manner that may compromise the performance of the device. Security measures have been incorporated into many mobile devices to prevent attackers from altering the function of the device.

One point of vulnerability for a mobile device is at boot time. Many attackers attempt to "break" the software while the device is powered down, performing an attack that, for example, replaces, in flash memory, a secured software image with an image that has been tampered with. In this context, an "image" refers to data that has been retrieved from a flash memory. If the device boots using the image in flash memory without first validating the image, the system is vulnerable to attack. For these reasons, the boot procedure in a secure environment employs security measures.

In a secure cold boot procedure, a secure boot ROM is a "root of trust" that performs the boot process in a manner that maintains a "chain of trust" for all images that are retrieved from the flash memory and passed to the operating system. The chain of trust means that images have a validation path that can be traced back to the secure boot ROM, which includes hardware based security information (e.g., a cryptographic key) that cannot be tampered with.

The secure boot ROM is firmware that is the first binary that executes after a device is powered on. Every time the secure boot ROM runs, it loads an additional firmware stack of software images from flash memory to "Low Power Data Retentive Memory" (LPDRM), which is a time consuming process. The loaded firmware stack is securely validated by secure boot ROM's security infrastructure, including one-time-programmable fuses, maintaining the chain of trust.

This validated second layer firmware stack then loads the kernel and operating system images from flash and validates these images, resulting in images that have a validation path back to the secure boot ROM. The secure cold boot process is complete when the operating system binary starts to execute.

When a device resumes operation after operating in low power mode, the secure cold boot procedure is employed to maintain the security of the device. The many flash operations in the secure cold boot procedure make it time consuming, degrading the performance of the device.

Figure 1:
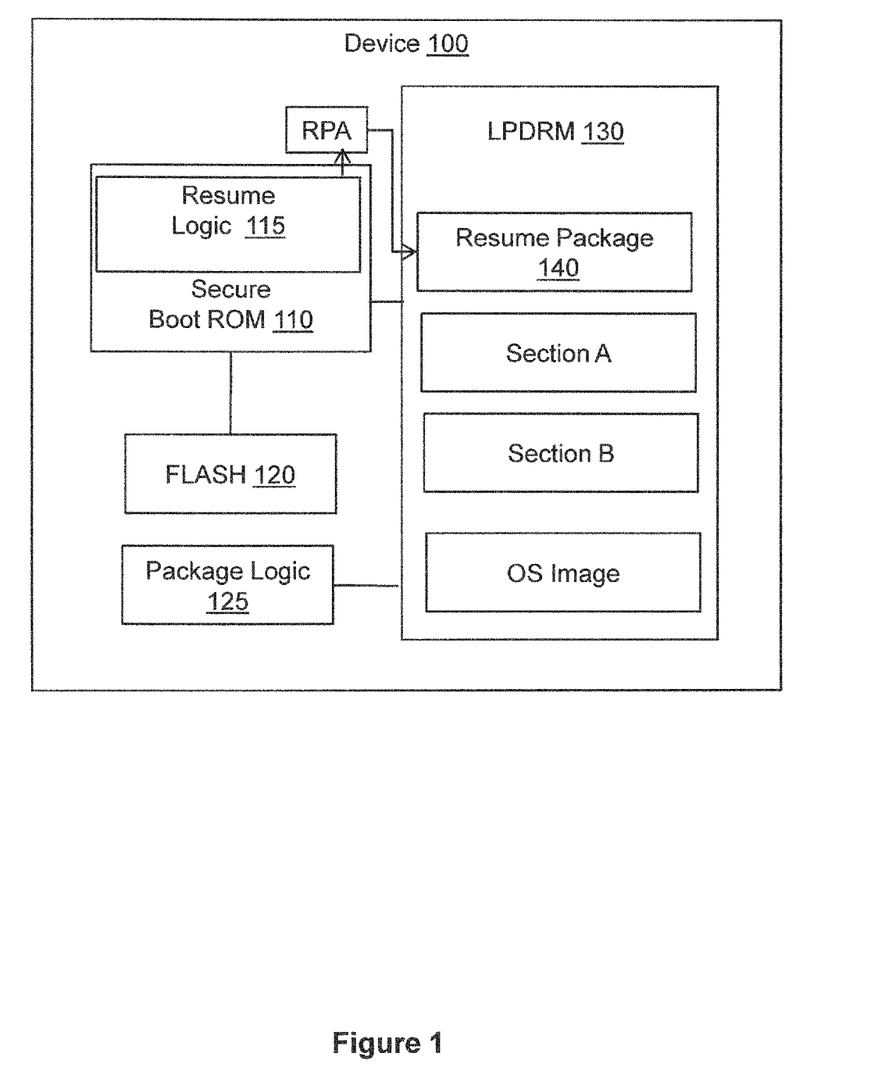
FIG. 1 illustrates one embodiment of a device associated with secure software resume from low power mode.

Described herein are examples of systems, methods, and other embodiments associated with providing a secure software resume from low power mode without performing time consuming operations that are part of a cold boot procedure in a secure processing environment. With reference to FIG. 1, one embodiment of a device 100 is shown that is capable of performing a secure software resume from low power mode. In one embodiment, the apparatus 100 is implemented on a chip including one or more integrated circuits configured to perform one or more of the functions described herein.

The device 100 includes a secure boot ROM 110, a flash memory 120, and a LPDRM 130. The secure boot ROM 110 is capable of validating the contents of the flash memory 120. During a normal cold boot, the secure boot ROM 110 transfers validated images from the flash memory 120 to the LPDRM 130 as described above. During a secure resume, contents of the LPDRM 130 are validated by the boot ROM so that control can be transferred to the operating system without transferring images from the flash memory 120.

To implement the secure resume from low power mode, the secure boot ROM 110 includes a resume logic 115 that has access to a resume package address RPA that points to resume information for use in secure resume. The resume package address may be stored in a predetermined location in the LPDRM, a hardware power register or a power state retentive register. To prepare for secure resume, a package logic 125 causes the operating system to perform several operations before putting the device into enter low power mode. The operating system leaves resume information in a resume package 140 in the LPDRM 130 at the resume package address. Because this preparation work is performed by the operating system, the secure resume process does not require significant hardware modifications.

Data sections A, B are also stored in the LPDRM 130. The data sections A, B may be saved to the LPDRM 130 by drivers (not shown) acting in response to a request from the operating system. Before entering low power mode, images corresponding to the data sections A, B will be stored in the flash memory 120 for use in a secure cold boot procedure. While two data sections are shown in FIG. 1, any number of data sections may be stored in the LPDRM 130. The data sections may be context information, such as register contents, that capture the operating status of the operating system or applications at the time low power mode was entered. An operating system image is also stored in the LPDRM 130.

In order to maintain the chain of trust, the resume package 140 includes validation information about the data sections A, B that can be used by the resume logic 115 to validate the data sections A, B when the device 100 resumes operation from low power mode. In one embodiment, the resume package 140 may also include image identifiers that specify images that must be loaded from the flash memory 120 by the secure boot ROM upon resume. Images that are designated as requiring loading from flash may be images that the operating system does not have access to. Only the identified images will be loaded from flash, saving time as compared to loading all images (e.g., images corresponding to data sections A, B) from flash. Once the resume package 140 is completed and stored in LPDRM 130, the operating system allows the device 100 to enter low power mode.

Figure 2:
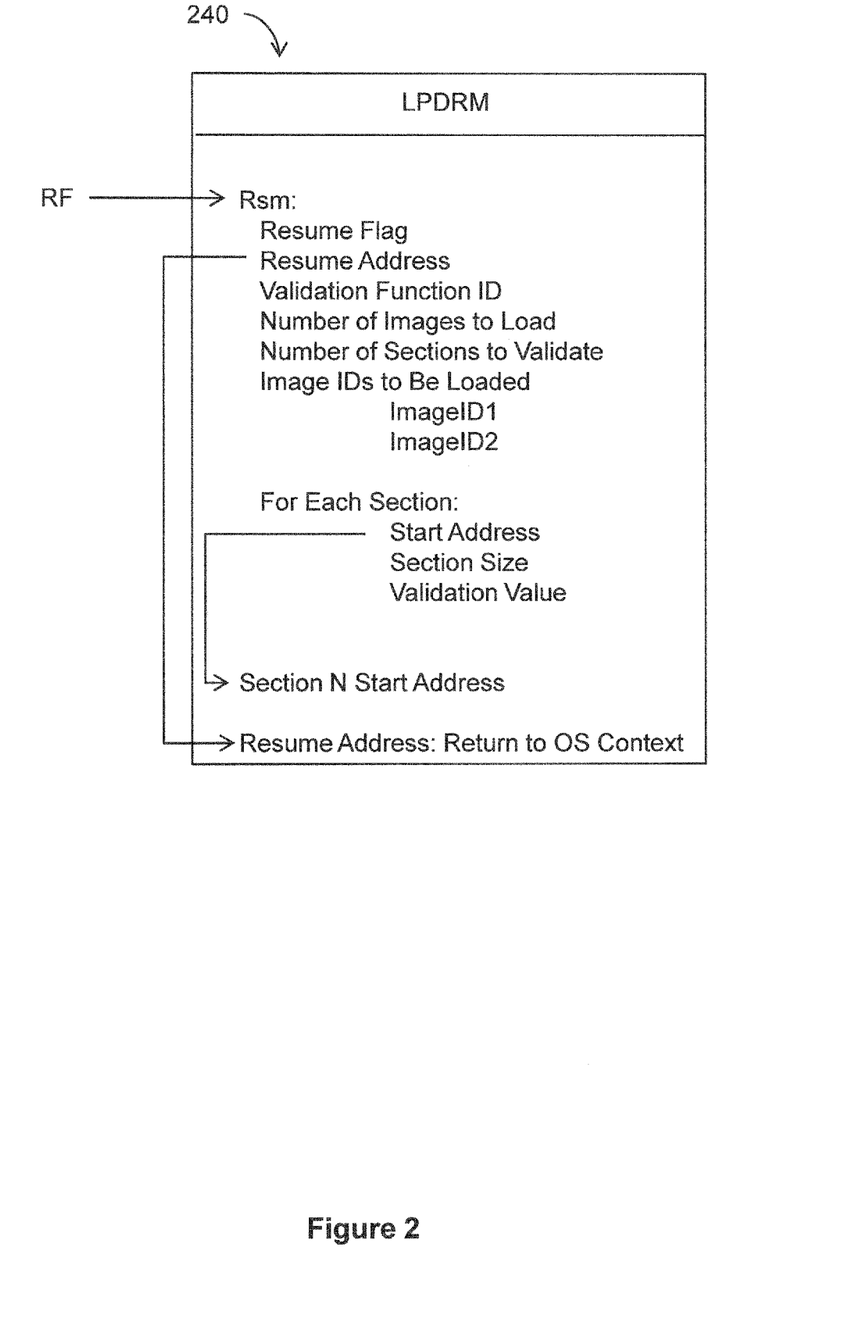
FIG. 2 illustrates one embodiment of a resume package for use with secure software resume from low power mode.

FIG. 2 illustrates one embodiment of a resume package 240 that is adapted for use with a LPDRM implemented with a dynamic random access memory (DRAM). To preserve the contents of the resume package 240 the LPDRM is set, by the operating system, to operate in mode that will persist the contents of the memory during low power mode. For example, a DRAM memory is set to self refresh mode. The resume package 240 is a raw binary header in DRAM called "Resume Package". The binary header can be used by the secure boot ROM during the resume process. The resume package 240 is stored in DRAM at a resume package address Rsm. The resume package address (e.g., RPA in FIG. 1) is accessed by the resume logic 115 and points to the resume package 240.

The resume package 240 includes a resume flag that can be set by the operating system to a predetermined value (e.g., 0x55AA55AA as shown) to indicate that the secure resume feature is active. If the resume flag is not set, the boot ROM will perform a secure cold boot procedure. The resume package 240 includes a resume address that points to the memory location in DRAM where the operating system is stored. After the data sections are validated and any identified images are loaded from flash, the boot ROM will transfer control to the operating system at this address. The resume package 240 also includes a validation function identifier that identifies a particular validation function that is used to validate images stored in the DRAM. In one embodiment, the validation function is a specific hash function.

A "Number of Images to Load" entry in the resume package 240 specifies how many images are to be loaded from flash memory upon resume. If the number of images to load is set to 0, then no images will be loaded from flash memory upon resume. The resume package 240 includes a number of sections to validate that specifies how many data sections are stored in the DRAM and are to be validated by the boot ROM upon resume. A list of image identifiers identifies the image to be loaded from flash. For example, if the number of images to load is set to 2, then there will be two image identifiers in the list of image identifiers.

For each data section stored in the DRAM, the resume package records a start address that points to a DRAM address where the data section is stored. The size of a portion of the data section to be validated is also recorded. If the size is set to 0, then no portion of the data section will be validated upon resume. A validation value for the data section is also stored in the resume package 240. The validation value is computed by performing the specified validation function on the specified portion of the data section. In some embodiments, the validation function is performed based on security information encoded in the secure boot ROM by security software or libraries. When the device resumes operation after exiting low power mode, the secure boot ROM will perform the specified validation function on the specified portion of the data section. If the boot ROM gets the same validation value as the validation value in the resume package, the data section is verified and the chain of trust is maintained.

Figure 3:
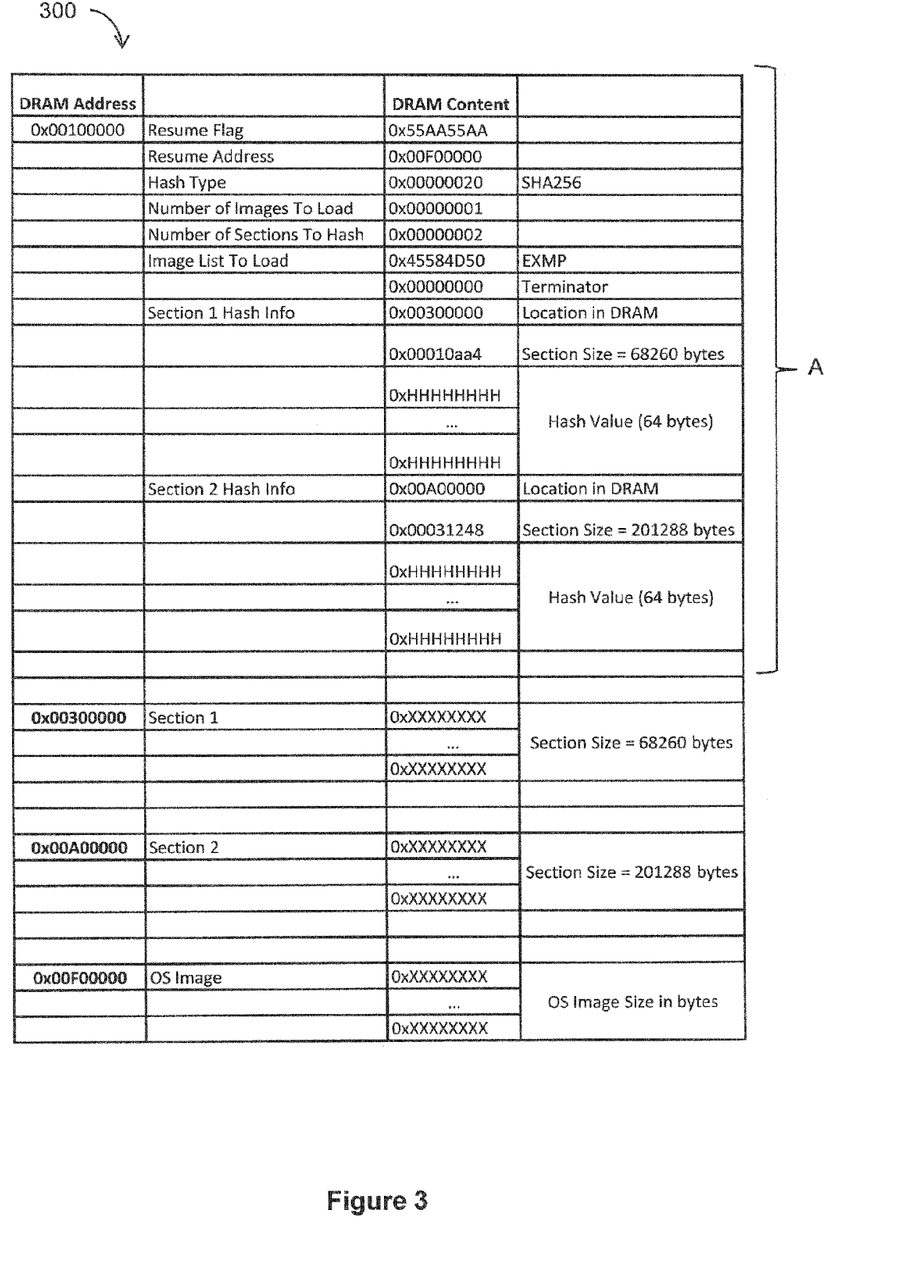
FIG. 3 illustrates one embodiment of a resume package for use with secure software resume from low power mode.

FIG. 3 illustrates one embodiment of a DRAM 300 that has been prepared as described above for performing a secure resume. The DRAM stores a resume package indicated by the bracket A as well as data section 1 and data section 2. When the secure boot ROM receives a boot signal from a device that is operating in low power mode, the secure boot ROM takes the DRAM memory out of self refresh mode. The secure boot ROM gets the resume package address from a predetermined memory location or a register. The resume package address for the embodiment illustrated in FIG. 3 points to address 0x0010000. The secure boot ROM checks the resume flag and determines that it is set (e.g., has value 0x55AA55AA). Since the resume flag is set, the secure resume feature is enabled and the secure boot ROM will perform the secure resume process.

The secure boot ROM determines that there are 2 data sections to hash (i.e., validate) using the specified hash type SHA 256. The secure boot ROM validates the integrity of the data section 1 by hashing 68260 bytes of data stored at 0x00300000 (e.g., data section 1) using the SHA 256 hash algorithm. The secure boot ROM compares the results to a hash value (i.e., validation value) of 0xHHHHHHHH . . . 0xHHHHHHHH found in the resume package. If the results match the hash value, the integrity of data section 1 is verified.

The secure boot ROM validates the integrity of the data section 2 by hashing 201288 bytes of data stored at 0x00A00000 (e.g., data section 2) using the SHA 256 hash algorithm. The secure boot ROM compares the results to a hash value (i.e., validation value) of 0xXXXXXXXX . . . 0XXXXXXXXX found in the resume package. If the results match the hash value, the integrity of data section 2 is verified.

If either data section is not able to be verified, the secure boot ROM will cancel the secure resume process and perform a cold boot procedure. If both data section 1 and data section 2 are verified, the secure boot ROM will load one image identified as "EXMP" from flash memory. The image EXMP is loaded and verified as described in the secure boot procedure above. Note that if the number of images to load field is set to 0, no images will be loaded from flash. After the image EXMP has been loaded from flash, the boot ROM jumps to the resume address 0x00F00000 and the operating system is in control of the device.

Figure 4:
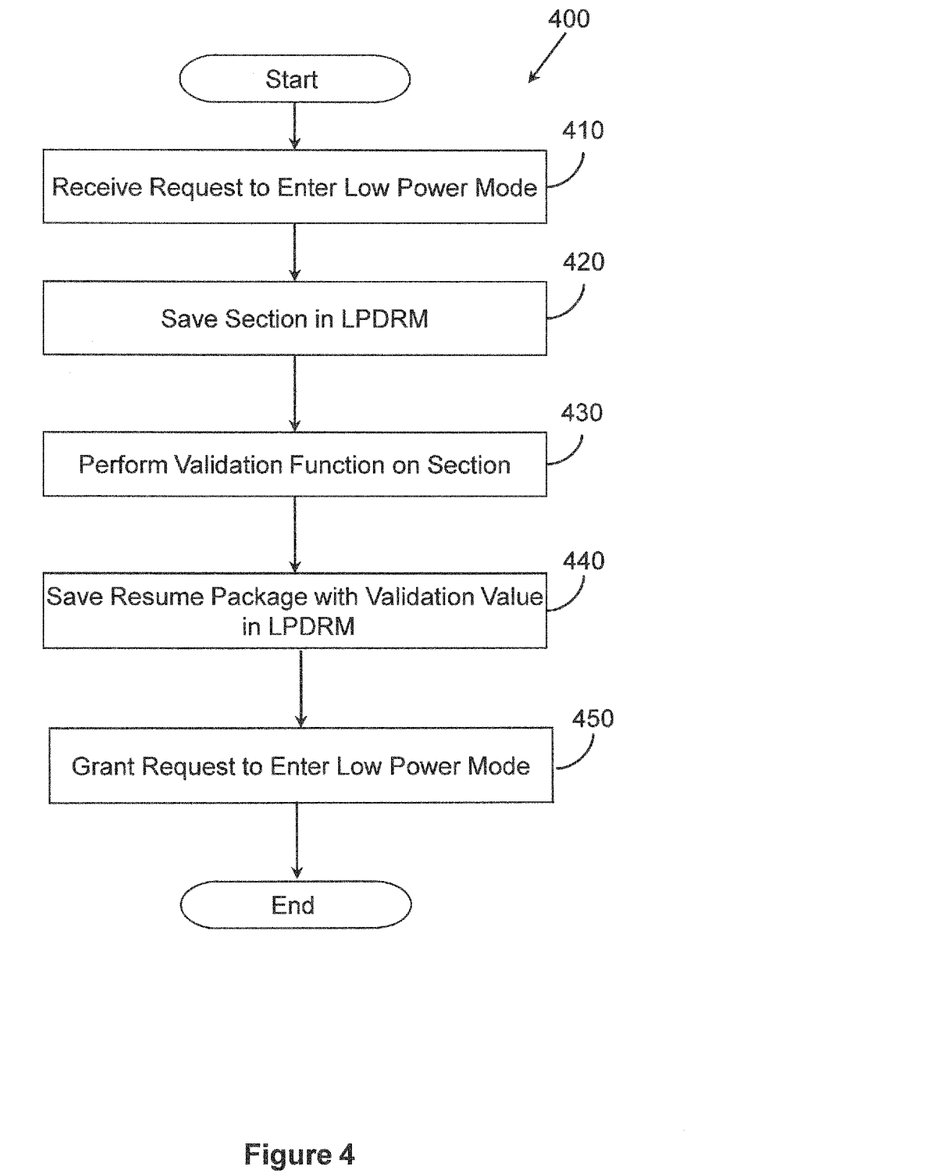
FIG. 4 illustrates one embodiment of a method associated with secure software resume from low power mode.

FIG. 4 illustrates one embodiment of a method 400 for preparing a device for a secure resume process. The method 400 may be performed by an operating system prior to granting a request from a device to enter a low power mode. The method 400 includes, at 410, receiving a request to enter a low power mode. In response to the request, at 420 a data section is stored in LPDRM. In one embodiment, the data section will have a corresponding image stored in a flash memory prior to entry into low power mode. The image will be transferred to LPDRM if a cold boot is used to return from low power mode. If the secure resume process is performed, the image will not be transferred to LPDRM because the validated data section will already be in the LPDRM.

At 430, the method includes performing a validation function on the data section to compute a validation value. Any number of validation functions could be employed. In some embodiments, the validation function is a hash function such as SHA 160, SHA 256, or SHA 512 and the validation value is a hash value that results from performing the hash function on the data section. At 440, the method includes constructing a resume package that includes the validation value and a location of the data section in the LPDRM and storing the resume package in the LPDRM. In some embodiments, the LPDRM is DRAM and the resume package is a raw binary header. The request to enter low power mode is granted at 450.

Figure 5:
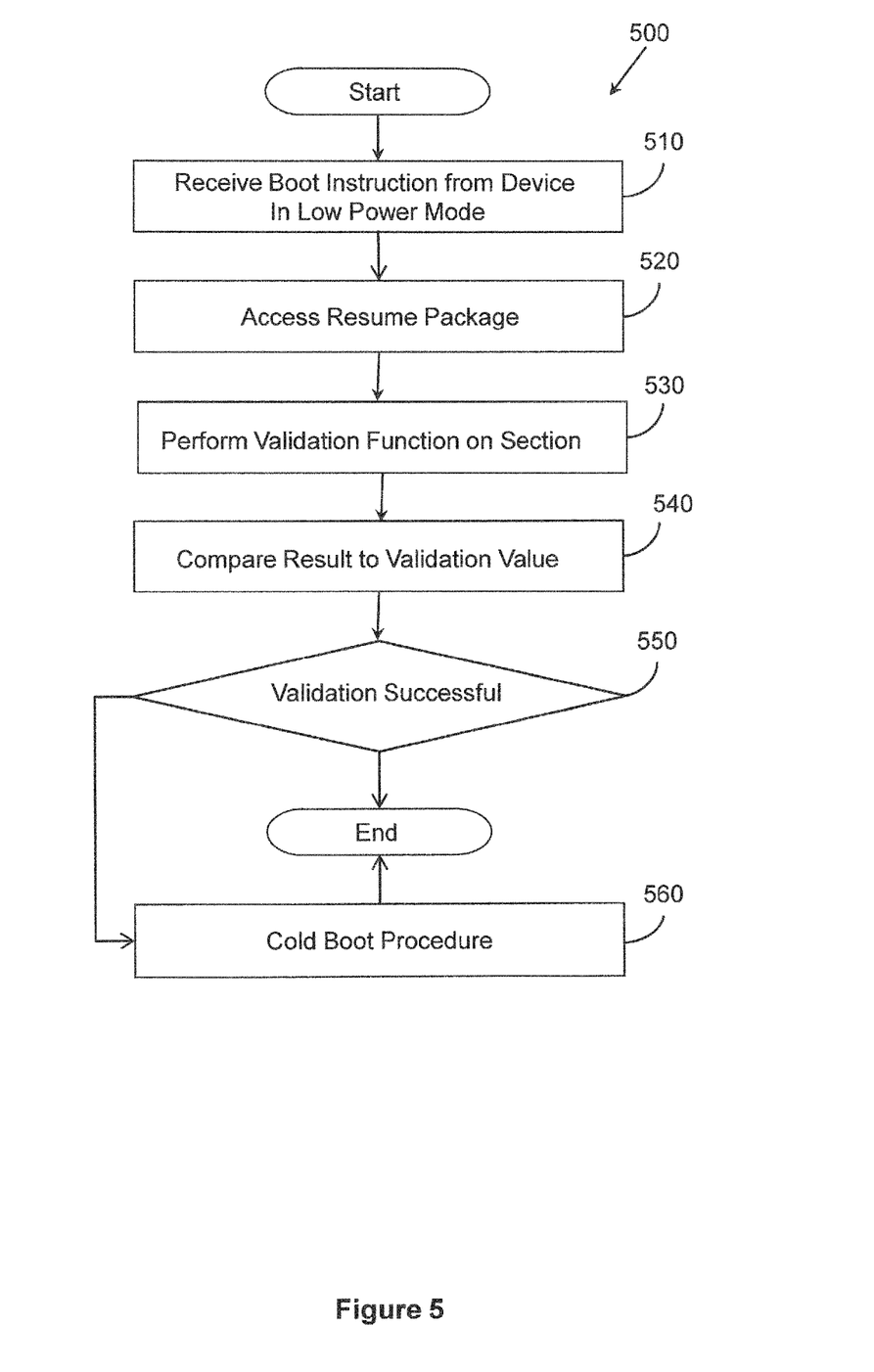
FIG. 5 illustrates one embodiment of a method associated with secure software resume from low power mode.

FIG. 5 illustrates one embodiment of a method 500 for performing a secure resume process. The method 500 may be performed by a secure boot ROM. The method includes, at 510, receiving a boot signal from a device operating in low power mode. The method includes, at 520, accessing the resume package. The resume package may be accessed by jumping to a resume package address that has been stored in a predetermined memory location or a state retentive register. The resume package identifies a data section stored in LPDRM, a validation function, and a validation value computed for the data section prior to entering low power mode.

The method includes, at 530, performing a validation function on a data section stored in the LPDRM to compute a resulting validation value. At 540, the resulting validation value is compared with the validation value in the resume package. At 550 when the resulting validation value agrees with the validation value in the resume package, the method 500 ends and control of the device is transferred to an operating system without loading an image corresponding to the data section to the LPDRM. In this manner, time consuming flash operations are skipped by verifying the integrity of data sections left in LPDRM prior to entering low power mode. If the data sections are not validated at 560 a cold boot procedure is performed. The cold boot procedure includes loading an image corresponding to the data section from flash memory instead of using the corrupted (e.g., unable to be validated) data section left in the LPDRM.

Figure 6:
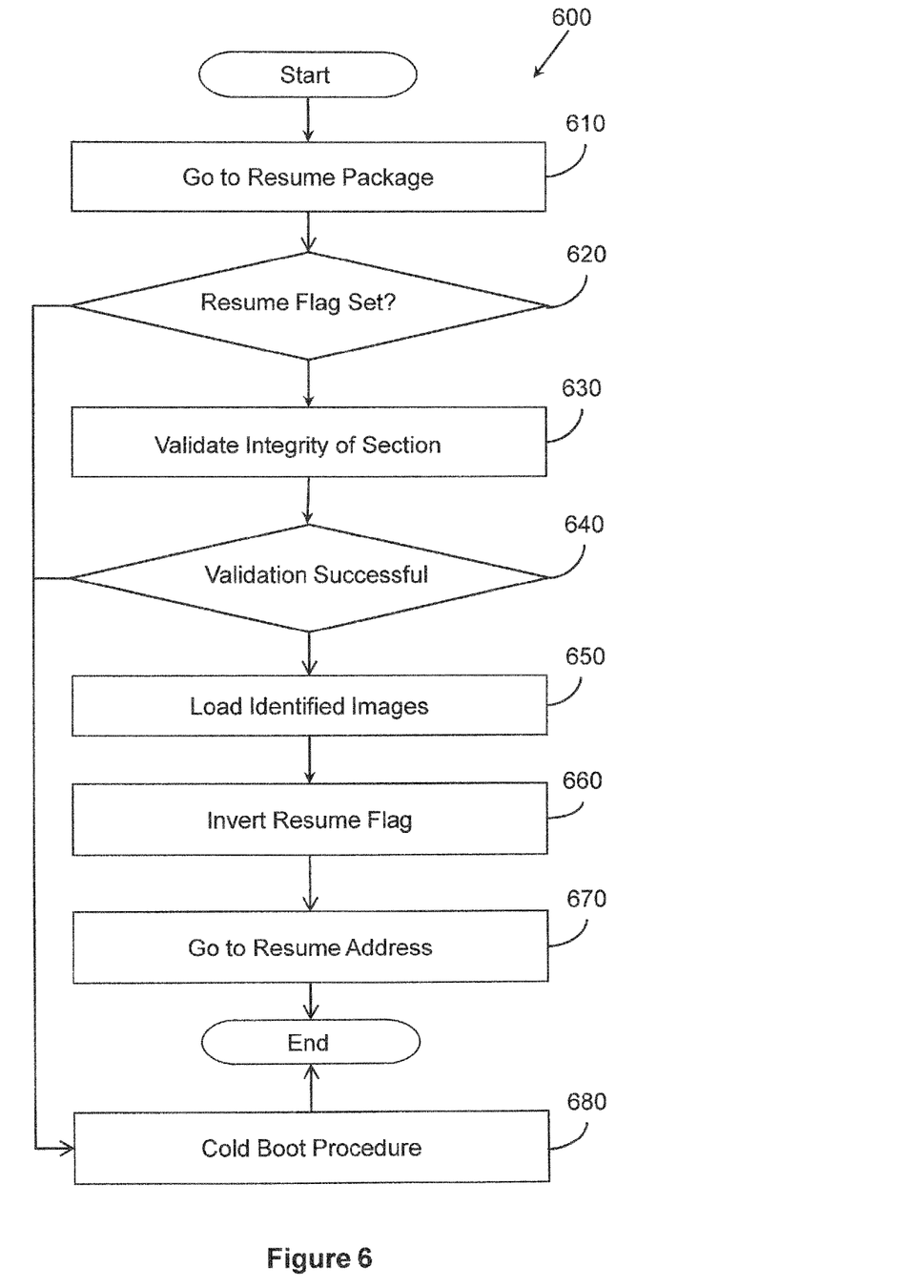
FIG. 6 illustrates one embodiment of a method associated with secure software resume from low power mode.

FIG. 6 illustrates one embodiment of a method 600 for performing a secure resume process. The method 600 may be performed by a secure boot ROM in response to receiving a boot signal from a device operating in low power mode. The method includes, at 610, going to a resume package by jumping to a resume package address that has been stored in a predetermined memory location or a state retentive register. At 620, a resume flag in the resume package is checked to determine if a secure resume feature has been enabled by the operating system prior to entering the low power mode. If the resume flag is not set, at 680 a cold boot procedure is performed.

The resume package identifies a data section stored in LPDRM, a validation function, and a validation value computed for the data section prior to entering low power mode. If the resume flag is set, the method includes, at 630, validating the integrity of one or more data sections that have been left in the LPDRM. The integrity of the data sections is validated based on a security value that has been hard coded into the secure boot ROM (e.g., a cryptographic key). In one embodiment, the integrity of a data section is validated by performing a validation function on a data section stored in the LPDRM to compute a resulting validation value. The resulting validation value is compared with the validation value in the resume package and if the validation values agree, the data section integrity is deemed to be validated.

At 640, if the data section integrity is not validated, at 680 a cold boot procedure is performed. The cold boot procedure includes loading an image corresponding to the data section from flash memory instead of using the corrupted (e.g., unable to be validated) data section left in the LPDRM. At 640, if the data section integrity is validated at 650 any images identified in the resume package are loaded from flash memory. At 660 the resume flag is inverted so that the operating system can determine that the secure resume process has just been performed. At 670, the method 600 includes going to a resume address where the operating system is stored to transfer control of the device to the operating system. In this manner control of the device is transferred to the operating system without loading any images corresponding to the validated data sections to the LPDRM.

As can be seen from the foregoing description, the techniques described herein provide a secure resume from low power mode that allows a device to resume operation quickly while maintaining the chain of trust. The resume package can be constructed to customize the resume process by specifying which data sections are to be validated and which, if any, images should be loaded from flash. Use of the techniques described herein allow many time consuming flash operations normally associated with a cold boot to be skipped in the resume process, speeding the return of a device from a low power mode.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A device, comprising:
   secure flash memory configured to store data in a manner that can be validated by a secure boot ROM;
   a low power data retentive memory (LPDRM);
   a package logic configured to:
     receive a request from the device to enter a low power mode;
     in response to the request to enter a low power mode,
       store a data section in the secure flash memory;
       store the data section in the LDPRM;
       construct a resume package that includes i) a location of the data section in the LPDRM, ii) an image identifier for an image to be loaded from the secure flash memory in a subsequent boot operation, and iii) a validation value that results from performing a validation function on the data section, and
       store the resume package in the LPDRM for use by the device in resuming operation when exiting the low power mode; and
   a resume logic configured to, in response to a boot signal from a device operating in low power mode:
     access the resume package;
     perform the validation function on the data section stored in the LPDRM to compute a resulting validation value;
     compare the resulting validation value with the validation value in the resume package;
     when the resulting validation value agrees with the validation value in the resume package:
       identify, in the resume package, the image identifier;
       load the image from the secure flash memory; and
       transfer control of the device to an operating system without loading an image corresponding to the data section to the LPDRM.

2. The apparatus of claim 1, wherein the resume logic is further configured to perform a cold boot procedure that loads the data section from the secure flash memory when the resulting validation value does not agree with the validation value in the resume package.

3. The apparatus of claim 1, wherein the validation function comprises a hash function and the validation value comprises a hash value that results from performing the hash function on the image.

4. The apparatus of claim 1, where the LPDRM comprises dynamic random access memory (DRAM).

5. The apparatus of claim 4, wherein the package logic is further configured to cause the DRAM to operate in a self refresh mode while the device is in the low power mode and the resume logic is configured to cause the DRAM to leave self refresh mode when the device exits the low power mode.

6. A method, comprising:
   receiving a request to enter a low power mode from a device;
   in response to the request,
     storing a data section in secure flash memory configured to store data in a manner that can be validated by a secure boot ROM during a cold boot procedure;
     storing the data section in LPDRM;
     performing a validation function on the data section to compute a validation value;
     constructing a resume package that includes i) the validation value, ii) a location of the data section in the LPDRM, and iii) an image identifier for an image to be loaded from the secure flash memory in a subsequent boot operation;

storing the resume package in the LPDRM for use by the device in resuming operation when exiting the low power mode; and granting the request to enter low power mode, in response to a boot signal from a device operating in low power mode:

accessing the resume package;

performing the validation function on the data section stored in the LPDRM to compute a resulting validation value;

comparing the resulting validation value with the validation value in the resume package;

when the resulting validation value agrees with the validation value in the resume package:

identifying, in the resume package, the image identifier;

loading the image from the secure flash memory;

transferring control of the device to an operating system without loading, from the secure flash memory, an image corresponding to the data section to the LPDRM.

7. The method of claim 6, further comprising performing a cold boot procedure that loads the data section in the secure flash memory when the resulting validation value does not agree with the validation value in the resume package.

8. The method of claim 6, wherein performing the validation function comprises performing a hash function and wherein the validation value comprises a hash value that results from performing the hash function on the data section.

9. The method of claim 6, wherein the LPDRM comprises a DRAM, the method further comprising causing the DRAM to operate in a self refresh mode while the device is in the low power mode and causing the DRAM to not operate in a self refresh mode when the device exits the low power mode.

10. The method of claim 6, further comprising accessing the resume package when a resume flag is set.

11. A device comprising:

a secure boot ROM that includes an encoded security value;

a secure flash memory configured to store data in a manner that is verifiable by the secure boot ROM based on the security value;

a LPDRM configured to store data for access by an operating system; and a resume logic configured to, in response to receiving a boot signal from the device operating in a low power mode:

cause the secure boot ROM to access a resume package stored in the LPDRM that includes a data section;

validate the data section stored in the LPDRM based on the security value, when the data section is successfully validated, transfer control of the device to an operating system without loading an image corresponding to the data section from the flash memory; and when the data section is not successfully validated, performing a cold boot procedure in which the data section is loaded from the secure flash memory.

12. The device of claim 11, further comprising a package logic configured to cause the operating system to compute a validation value for the data section based on the security value and store the validation value in the resume package prior to the device entering low power mode.

13. The device of claim 11, wherein the secure boot ROM comprises one or more one-time-programmable fuses that encode the security value.

14. The device of claim 11, wherein the LPDRM comprises a dynamic random access memory (DRAM).

15. The device of claim 14, wherein the package logic is configured to cause the operating system to construct a resume package that includes the validation value and store the resume package as a raw binary header in the DRAM.

16. The device of claim 11, wherein the package logic is further configured to cause the operating system to store, in the resume package, a list of images to be loaded from the flash memory by the secure boot ROM when a boot signal is received from the device in low power mode.

\* \* \* \* \*